United States Patent
Boodaghians et al.

(10) Patent No.: US 9,963,240 B2
(45) Date of Patent: May 8, 2018

(54) POWER MANAGEMENT FOR GALLEY WITH FUEL CELL

(71) Applicant: Driessen Aerospace Group N.V., RL Alkmaar (NL)

(72) Inventors: Razmik Boodaghians, Glendale, CA (US); Yannick Brunaux, Saint CYR l'Ecole (FR); Adriaan Eijkelenboom, KN Schoonhoven (NL); Andreas Hoogeveen, GE Enkhuizen (NL); Jean-Paul Libis, Bievres (FR); Franck Masset, St. Georges Motel (FR); Andreas Metz, Dillenburg-Niederscheld (DE); Frederic Muyu, Herborn (DE); Lucas Nastase, Lahnau (DE); Achim Reeb, Edmonds, WA (US)

(73) Assignee: Driessen Aerospace Group N.V., Alkmaar (NL)

( * ) Notice: Subject to any disclaimer, the term of this patent is extended or adjusted under 35 U.S.C. 154(b) by 743 days.

(21) Appl. No.: 14/384,168

(22) PCT Filed: Mar. 13, 2013

(86) PCT No.: PCT/IB2013/052004
§ 371 (c)(1),
(2) Date: Sep. 10, 2014

(87) PCT Pub. No.: WO2013/136286
PCT Pub. Date: Sep. 19, 2013

(65) Prior Publication Data
US 2015/0028670 A1    Jan. 29, 2015

Related U.S. Application Data

(60) Provisional application No. 61/734,645, filed on Dec. 7, 2012, provisional application No. 61/724,415, filed
(Continued)

(51) Int. Cl.
*B60L 1/00* (2006.01)
*B60L 3/00* (2006.01)
(Continued)

(52) U.S. Cl.
CPC ............ *B64D 41/00* (2013.01); *B60R 16/033* (2013.01); *B64D 11/04* (2013.01); *H01M 8/0494* (2013.01);
(Continued)

(58) Field of Classification Search
CPC ........ B64D 41/00; B64D 11/04; B64D 11/06; B60H 1/00; B60H 1/00592; H02J 3/14;
(Continued)

(56) References Cited

U.S. PATENT DOCUMENTS

| 8,141,185 B2 | 3/2012 | Hoffjann et al. |
| 2004/0043276 A1 | 3/2004 | Hoffjann et al. |

(Continued)

FOREIGN PATENT DOCUMENTS

| CA | 2700658 A1 | 4/2009 |
| CN | 102144344 | 8/2011 |

(Continued)

OTHER PUBLICATIONS

Chinese Patent Application No. 2013800136664, Office Action (and English translation) dated Sep. 18, 2015.
(Continued)

*Primary Examiner* — Fritz M Fleming
*Assistant Examiner* — Jagdeep Dhillon
(74) *Attorney, Agent, or Firm* — Kilpatrick Townsend & Stockton LLP; Dean W. Russell; Kristin M. Crall (57) ABSTRACT

Described are power management systems having at least one fuel cell system, a power distribution unit, at least one galley insert, a galley network controller, a control panel, and/or at least one battery pack. The power management
(Continued)

system compares a power output from the power distribution unit to a maximum load level and/or to a minimum load level, instructs the galley network controller to cycle the galley insert off and/or set an operation of the galley insert to a lower power consumption level when the power output approaches and/or is above the maximum load level, and instructs the galley network controller to cycle the galley insert on and/or set the operation of the galley insert to a higher power consumption level when the power output approaches and/or is below the minimum load level.

16 Claims, 7 Drawing Sheets

Related U.S. Application Data on Nov. 9, 2012, provisional application No. 61/612,479, filed on Mar. 19, 2012, provisional application No. 61/610,025, filed on Mar. 13, 2012.

(51) Int. Cl.

| | | |
|---|---|---|
| *H02G 3/00* | (2006.01) | |
| *B64D 41/00* | (2006.01) | |
| *B64D 11/04* | (2006.01) | |
| *H01M 8/04828* | (2016.01) | |
| *H01M 8/04537* | (2016.01) | |
| *H02J 1/14* | (2006.01) | |
| *B60R 16/033* | (2006.01) | |
| *H02J 1/00* | (2006.01) | |

(52) U.S. Cl.
CPC ... *H01M 8/04619* (2013.01); *H01M 8/04626* (2013.01); *H01M 8/04947* (2013.01); *H02J 1/14* (2013.01); *B64D 2041/005* (2013.01); *H01M 2250/20* (2013.01); *H01M 2250/402* (2013.01); *H01M 2250/405* (2013.01); *H02J 2001/004* (2013.01); *Y02B 90/12* (2013.01); *Y02B 90/16* (2013.01); *Y02T 50/46* (2013.01); *Y02T 90/32* (2013.01); *Y02T 90/36* (2013.01)

(58) Field of Classification Search
CPC .... H02J 3/16; H02J 1/00; F25B 21/02; G05D 23/00; F28F 27/00
USPC ........ 307/9.1, 10.1, 66, 64, 80, 43; 165/287, 165/96, 200; 361/93.2
See application file for complete search history.

(56) References Cited

U.S. PATENT DOCUMENTS

| | | | | |
|---|---|---|---|---|
| 2004/0057177 | A1* | 3/2004 | Glahn | H02J 3/14 361/62 |
| 2004/0268166 | A1 | 12/2004 | Farkas et al. | |
| 2005/0121978 | A1* | 6/2005 | McAvoy | H02J 3/14 307/43 |
| 2006/0138278 | A1 | 6/2006 | Gans | |
| 2007/0172707 | A1 | 7/2007 | Hoffjann et al. | |
| 2008/0001026 | A1 | 1/2008 | Hoffjann et al. | |
| 2008/0038597 | A1 | 2/2008 | Hoffjann et al. | |
| 2008/0133076 | A1 | 6/2008 | Formanski et al. | |
| 2009/0103221 | A1* | 4/2009 | Aronson | H02J 3/14 361/93.2 |
| 2010/0071384 | A1* | 3/2010 | Lu | B60H 1/00592 62/3.2 |
| 2010/0193629 | A1 | 8/2010 | Breit et al. | |
| 2010/0221642 | A1 | 9/2010 | Frahm et al. | |
| 2012/0223185 | A1* | 9/2012 | Tran | B64D 11/04 244/118.5 |
| 2012/0318914 | A1* | 12/2012 | Rajashekara | B64D 41/00 244/58 |
| 2013/0047630 | A1* | 2/2013 | Lu | F25B 21/02 62/3.6 |
| 2013/0048264 | A1* | 2/2013 | Lu | G05D 23/00 165/287 |
| 2013/0210329 | A1 | 8/2013 | God et al. | |

FOREIGN PATENT DOCUMENTS

| | | |
|---|---|---|
| DE | 102006042300 B4 | 9/2008 |
| DE | 102007054291 A1 | 4/2009 |
| EP | 1650846 A1 | 4/2006 |
| EP | 2200142 A1 | 6/2010 |
| EP | 2213571 A2 | 8/2010 |
| WO | 2006058774 A2 | 6/2006 |
| WO | 2007039211 A1 | 4/2007 |
| WO | 2007057188 A1 | 5/2007 |
| WO | 2011089016 A2 | 7/2011 |

OTHER PUBLICATIONS

PCT/IB2013/052004, International Preliminary Report on Patentability dated Sep. 25, 2014, 9 pages.
Chinese Patent Application 201380013666.4, Search Report, dated Sep. 8, 2015.
Chinese Patent Application 201380013666.4, Second Office Action, dated May 31, 2016.
Chinese Patent Application 201380013666.4, Notice of Allowance, dated Jan. 3, 2017.
PCT/IB2013/052004, Search Report and Written Opinion dated Jan. 2, 2014, 12 pages.

* cited by examiner

POWER MANAGEMENT FOR GALLEY WITH FUEL CELL

CROSS REFERENCE TO RELATED APPLICATIONS

This application is the U.S. national phase of International Patent Application Serial No. PCT/IB2013/052004, filed on Mar. 13, 2013, entitled "POWER MANAGEMENT FOR GALLEY WITH FUEL CELL ("the '004 application") which is related to and claims priority benefits from U.S. Provisional Application Ser. No. 61/610,025, filed can Mar. 13, 2012, entitled "IDEAS USING A FC (FUEL CELL) FOR GALLEYS, LAVATORIES AND TOILET SYSTEM" ("the '025 application"), U.S. Provisional Application Ser. No. 61/612,479, filed on Mar. 19, 2012, entitled "FUEL CELL FOR USE IN AN AIRCRAFT GALLEY" ("the '479 application"), U.S. Provisional Application Ser. No. 61/724,415, filed on Nov. 9, 2012, entitled "SMART POWER MANAGEMENT SYSTEMS FOR USE ON-BOARD AIRCRAFT AND OTHER PASSENGER TRANSPORT VEHICLES" ("the '415 application"), and U.S. Provisional Application Ser. No. 61/734,645, filed on Dec. 7, 2012, entitled "GALLEY AND LAVATORY AND OTHER POWER CONSUMER(S) POWERED BY A FUEL CELL" ("the '645 application"). The '004, '025, '479, '415, and '645 applications are hereby incorporated herein in their entireties by this reference.

FIELD OF THE INVENTION

Embodiments of the present invention relate generally to galleys, and particularly to galleys that have various features and capabilities powered by a fuel cell system. Embodiments are useful in relation to the field of aerospace and ground transportation vehicles, particularly to improve power management of the galley and especially the regulation of the power demand and delivery. The galleys may be provided with one or more of the following features: trash compactor; bun warmer/warming components; dishwasher; convection oven; steam oven; freezer/refrigerator; air chiller/chilled compartments; coffee/espresso maker; water heater; galley waste disposal unit; heat bar carts; surface cleaning; heating/cooling system; independent ventilation; lighting system; water supply; water line heating; power supply for laptop, phone charging, and other personal powered systems; or any combination thereof, and the power for these features may be provided by power generated by a fuel cell and/or by the by-products created by the fuel cell.

BACKGROUND

A number of components on-board an aircraft require electrical power for their activation. Many of these components are separate from the electrical components that are actually required to run the aircraft (i.e., the navigation system, fuel gauges, flight controls, and hydraulic systems). For example, aircraft also have catering equipment, heating/cooling systems, lavatories, power seats, water heaters, and other components that require power as well. Specific components that may require external power include, but are not limited to, trash compactors, ovens and warming compartments (e.g., steam oven, convection oven, bun warmer), optional dish washer, freezer, refrigerator, coffee and espresso makers, water heaters (for tea), air chillers and chilled compartments, galley waste disposal, heated or cooled bar carts/trolleys, surface cleaning, area heaters, cabin ventilation, independent ventilation, area or spot lights (e.g., cabin lights and/or reading lights for passenger seats), water supply, water line heating to prevent freezing, charging stations for passenger electronics, electrical sockets, emergency lighting, and combinations thereof.

However, one concern with these components is their energy consumption. As discussed, galley systems for heating and cooling are among several other systems aboard the craft which simultaneously require power. Frequently, such systems require more power than can be drawn from the aircraft engines' drive generators, necessitating additional power sources, such as a kerosene-burning auxiliary power unit ("APU") (or by a ground power unit if the aircraft is not yet in flight). This power consumption can be rather large, particularly for long flights with hundreds of passengers. Additionally, use of aircraft power produces noise and $CO_2$ emissions, both of which are desirably reduced, as well as typically requiring fossil fuels for operation.

Figure 1:
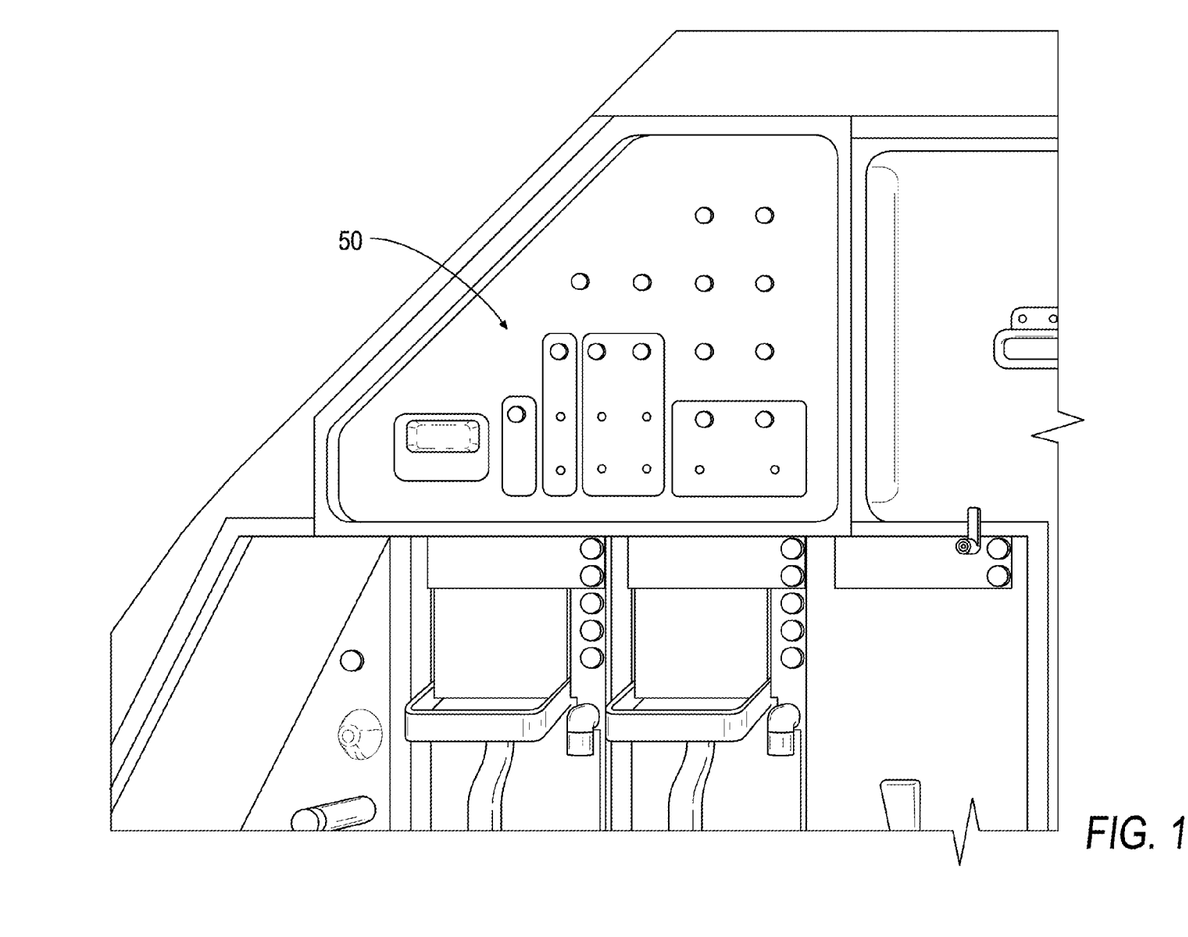
FIG. 1 is a perspective view of a control panel for a typical control system for GAINs.

Typically, galley feeders are sized for max load and safety margin load, in which all electrical Galley Inserts ("GAINs") are running at max load simultaneously. Currently, there is no intelligent system distributing power to individual GAINs. Rather, the crew controls the power distribution to determine which equipment is operated when and in what combination, as shown in the control panel 50 in FIG. 1, which provides flexibility to meet customers' needs but does not optimize galley power consumption.

Accordingly, it is desirable to identify ways to improve fuel efficiency and power management by providing innovative ways to power these components and distribute loads among GAINs.

Further, a number of systems on-board an aircraft require water for their use. Galleys are connected to the aircraft potable water tank, and water is required for many of the related on-board services. Water pipes connect the water tank to the water consumers. For example, coffee cannot be made, hand-washing water is not provided, and so forth, until the APU or electrical switch is on in order to allow water to flow. Some examples of the water consumers on-board aircraft are the steam oven, beverage maker (coffee/espresso/tea), water boiler, tap water supply, and the dish washer. Aircraft typically carry large amounts of potable water in the potable water tanks, which is uploaded when the aircraft is on the ground. A number of water saving attempts have been made to help re-use certain types of water onboard aircraft, but it is still desirable to generate new ways to generate and/or re-use water on-board aircraft. Other systems use heat, which is also typically generated by separate units. For example, heated water is desirable for use in warming hand-washing water (and to prevent freezing of the water pipes), the ovens and warmers onboard require heat, as well as the cabin heating units.

The present inventors have thus sought new ways to generate power to run on-board components, as well as to harness beneficial by-products of that power generation for other uses on-board passenger transport vehicles, such as aircraft.

The relatively new technology of fuel cells provides a promising cleaner and quieter means to supplement energy sources already aboard aircrafts. A fuel cell has several outputs in addition to electrical power, and these other outputs often are not utilized. Fuel cell systems combine a fuel source of compressed hydrogen with oxygen in the air to produce electrical and thermal power as a main product. Water and oxygen depleted air are produced as by-products, which are far less harmful than $CO_2$ emissions from current aircraft power generation processes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the invention relate to a power management system comprising at least one fuel cell system, a power distribution unit electrically connected to the fuel cell system so as to receive a power output from the fuel cell system, at least one galley insert electrically connected to the power distribution unit so as to receive a power output from the power distribution unit, a galley network controller, and one or more processors in communication with the galley network controller, the power distribution unit, and the galley insert.

In some embodiments, the power management system also includes a control panel. The power management system may also include at least one battery pack electrically connected to the fuel cell system and the power distribution unit, and may further include at least one of an ultra capacitor bank, super capacitor bank, and an energy storage source. According to certain embodiments, at least one of an additional monument and an attendant related system in communication with the galley network controller are included with the power management system.

The fuel cell system may further comprise at least one other output of thermal energy, water, or oxygen-depleted air. A galley may be powered by the power output and the other output of the fuel cell system. The galley insert may comprise a bun warmer, a convection oven, a water heater, a beverage maker, a bar cart, or an area light.

According to certain embodiments, the power management system compares a power output from the power distribution unit to a maximum load level and instructs the galley network controller to cycle the galley insert off via the power distribution unit and/or set an operation of the galley insert to a lower power consumption level when the power output approaches and/or is above the maximum load level. The power management system may also compare the power output from the power distribution unit to a minimum load level and instruct the galley network controller to cycle the galley insert on via the power distribution unit and/or set the operation of the galley insert to a higher power consumption level when the power output approaches and/or is below the minimum load level.

The power management system may also instruct the galley network controller to (i) acquire a power output from the battery pack via the power distribution unit when the power output approaches and/or is above the maximum load level, and (ii) send at least a portion of the power output from the fuel cell system to the battery pack via the power distribution unit when the power output approaches and/or is below the minimum load level.

The power management system may also instruct the galley network controller to (i) limit power consumption by the at least one additional monument and attendant related system when the power output approaches and/or is above the maximum load level and (ii) increase power consumption by the at least one additional monument and attendant related system when the power output approaches and/or is below the minimum load level.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are systems and processes for providing galleys that are powered by fuel cell systems or other suitable power sources with intelligent management of that power. While the galleys are discussed for use in aircrafts, they are by no means so limited and may be used in buses, trains, or other forms of transportation equipped with a galley. The galleys discussed herein also may be stand-alone galleys or portable galleys used in any other suitable environment. When powered by an appropriate fuel cell system and managed efficiently, the galley's operation can be made independent of (or less dependent on) the vehicle's (or surrounding environment's) electrical power system.

Figure 2:
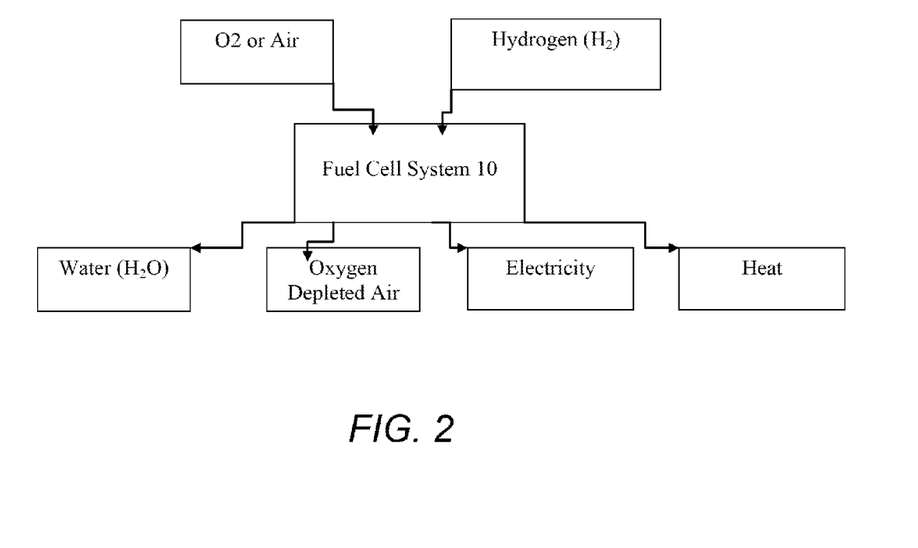
FIG. 2 is a schematic example of input elements that may be used for a fuel cell system, showing the materials needed to generate power ($O_2$ and $H_2$) and the output elements ($H_2O$, oxygen-depleted air, and heat) that may be reused by additional aircraft components.
Figure 3:
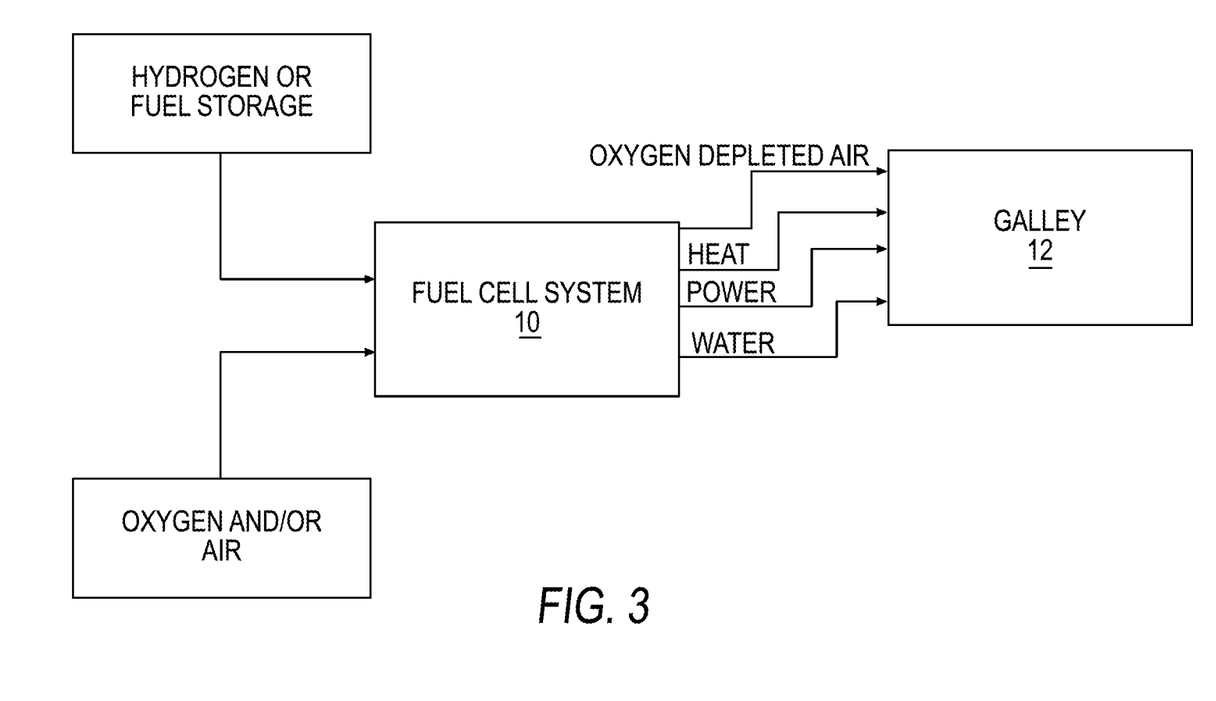
FIG. 3 is an example of inputs and outputs of a fuel cell system and non-limiting examples of how the outputs might be used.

A fuel cell system 10 is a device that converts chemical energy from a chemical reaction involving hydrogen or other fuel source and oxygen rich gas (e.g., air) into usable electrical energy. As illustrated in FIGS. 2-3, hydrogen or another fuel source combines with oxygen in the fuel cell system 10 to generate electrical energy (power). Along with the generated electrical energy, the fuel cell system 10 produces water, thermal power (heat), and oxygen-depleted air ("ODA") as by-products. Frequently, the water, heat, and ODA by-products are not used and therefore become waste. As disclosed herein, some or all of the electrical energy, heat, water, and ODA may be used to power a galley, such as but not limited to, a galley used in an aircraft.

Any appropriate fuel cell system may be used, including, but not limited to, a Proton Exchange Membrane Fuel Cell ("PEMFC"), a Solid Oxide Fuel Cell ("SOFC"), a Molten Carbonate Fuel Cell ("MCFC"), a Direct Methanol Fuel Cell ("DMFC"), an Alkaline Fuel Cell ("AFC"), or a Phosphoric Acid Fuel Cell ("PAFC"). Any other existing or future fuel cell system technology, including but not limited to a hybrid solution, may also be used.

Figure 4:
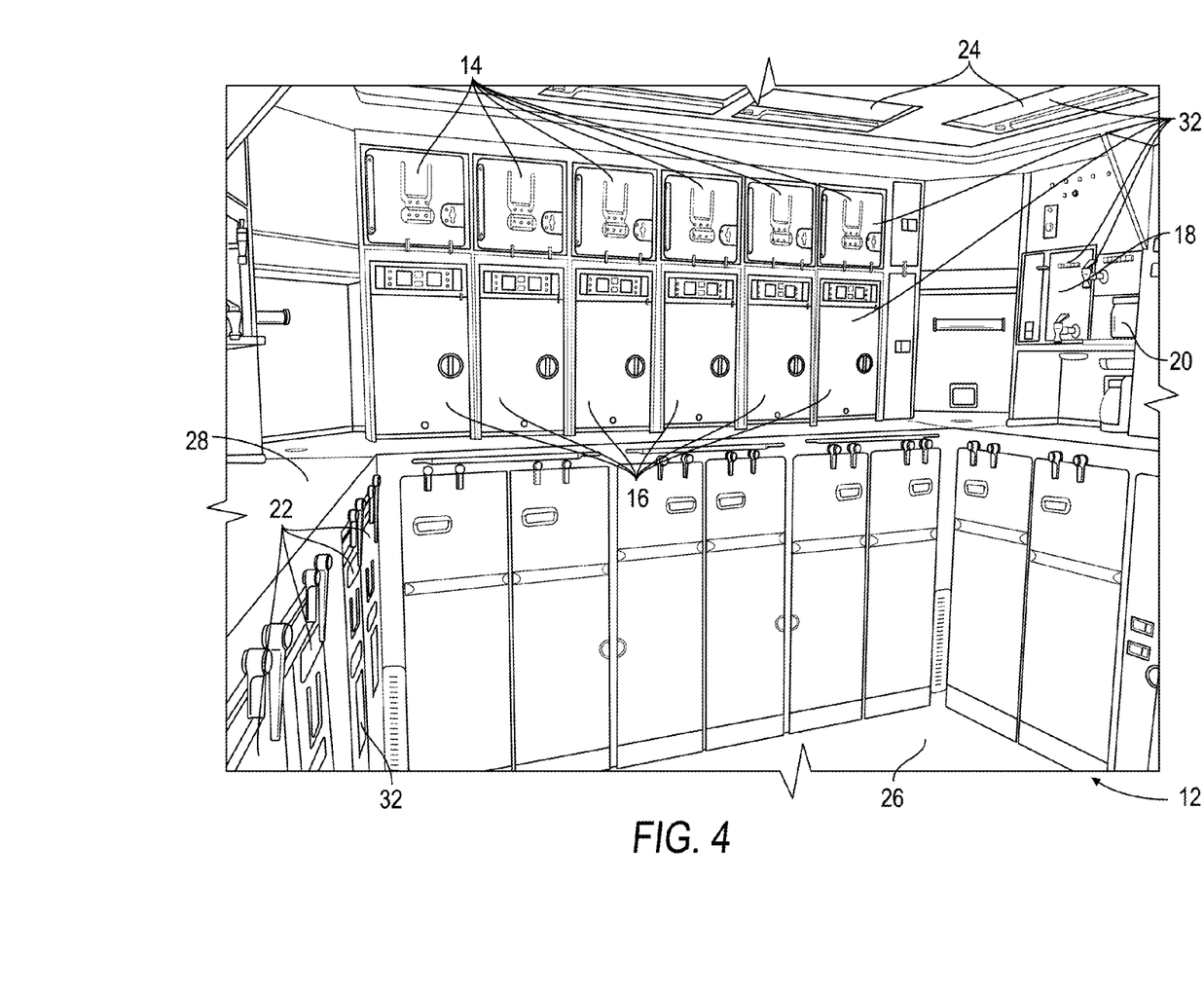
FIG. 4 is a perspective view of a galley configured to be powered by a fuel cell system, according to certain embodiments of the present invention.

FIG. 4 illustrates a non-limiting embodiment of a galley 12 configured to be powered by at least one fuel cell system, such as the fuel cell system 10 shown in FIGS. 2-3, or any other suitable fuel cell system. As shown in FIG. 4, the galley 12 may include one or more GAINs 32, such as bun warmers 14, convection ovens 16, water heaters 18, beverage makers 20, heated or cooled bar carts/trolleys 22, area lights 24. In other embodiments, the galley 12 may include additional GAINs 32, such as steam ovens, optional dish washers, freezers, refrigerators, air chillers and chilled compartments, galley waste disposal unit ("GI/VDU"), and any other suitable feature or element, some of which are discussed below. Furthermore, the galley 12 may additionally comprise a floor 26, and various surfaces 28.

The fuel cell system 10 may be located in any suitable location on the aircraft. For example, a fuel cell system 10 used to power other aspects of an aircraft may also be used to power the galley 12, or a separate fuel cell system 10 may be used to power the galley 12. Power needed by the galley 12 may be supplied directly by one or more fuel cell systems 10 or may be supplied or supplemented by any suitable electrical energy storage (such as battery packs, ultra capacitor banks, super capacitor banks, energy storage source, etc.) charged by power generated from a fuel cell system 10 or otherwise. Supplemental power may also be supplied by a typical power source in an aircraft, such as the ground power unit or the aircraft power unit.

If the fuel cell system 10 is positioned within or near the galley 12, the power is generated near the point of use and does not need to travel a long distance and therefore power dissipation is minimized. Moreover, if the fuel cell system 10 is positioned within or near the galley 12, the fuel cell system 10 may also be used to power other aircraft systems such as, but not limited to, passenger seats, passenger entertainment systems, emergency lighting, reading lights, lavatory units, etc., whether or not these systems are in the vicinity of the galley 12, so that the required energy/power output is more stable and there is less energy waste.

More than one fuel cell system 10 may be used if needed, and the size of the one or more fuel cell systems 10 may be based on the energy/power requirements of the galley 12 and/or other systems.

Figure 5:
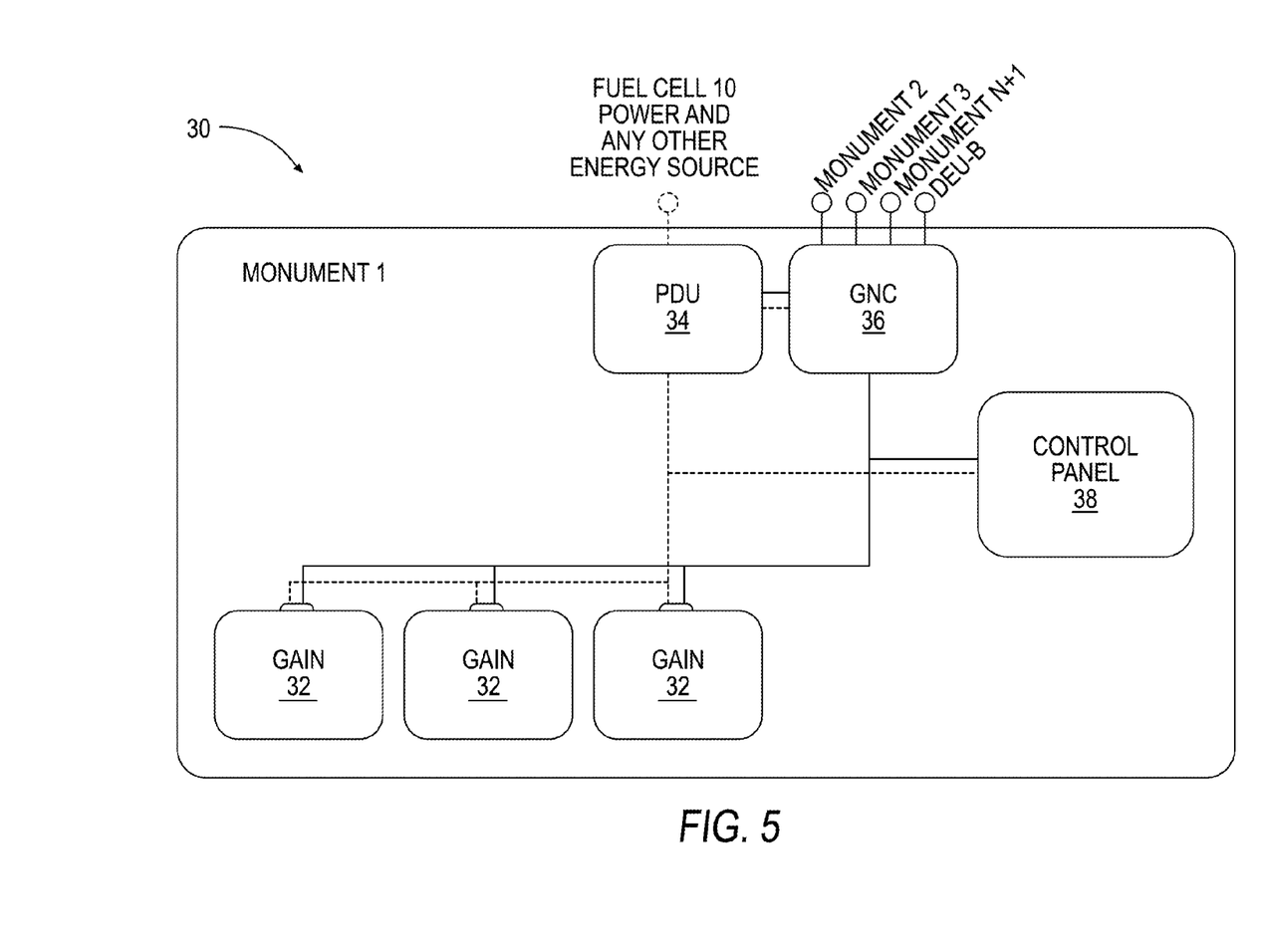
FIG. 5 is a diagram illustrating a power management system for a fuel cell system, according to certain embodiments of the present invention.

In certain embodiments, as shown in FIG. 5, a power management system 30 may be included with the fuel cell system 10 to distribute power efficiently to the individual GAINs 32. The power management system 30 may comprise a power distribution unit ("PDU") 34, a galley network controller ("GNC") 36, and a control panel 38. In certain embodiments, the power management system 30 may be connected to the GAINs 32 via an ARINC 810 and/or 812 connector. However, one of ordinary skill in the relevant art will understand that this is but a few types of connectors that may be used and other suitable connectors may be used as needed or desired.

The PDU 34 is configured to switch the main power to the GAINs 32 on/off using relays or other suitable devices. The PDU 34 may also include circuit protection. The PDU 34 may also supply power to the GNC 36 and/or the control panel 38.

The GNC 36 is configured to control the operation/cycle of the GAINs 32 via a network or system bus 210. In certain embodiments, the GNC 36 may also be configured to control the operation/cycle of other devices outside the galley 12, such one or more additional monuments 42 (i.e., lavatories and crew rest compartments) and/or attendant related system(s) 44 (i.e., additional attendant panels, attendant indication panels, handsets, slide and door sensors, ice protection control units, emergency power supply units, autonomous standby power supply units, slide release power supply units, smoke detectors, vacuum generators, and flush control units). The information from the GNC 36 to the attendant related systems 44 may be transmitted via one or more encoder unit B ("DEU-B") interfaces.

The control panel 38 is configured to function as the human-machine interface between the power management system 30 and the crew. The control panel 38 may also provide additional functionality, such as programming food and/or water heating schedules. The control panel 38 serves as the brains behind the power management system 30 and contains the programmed maximum load level for the power management system 30.

In certain embodiments, at least one battery pack 40 or other energy source may also be connected to the power management system 30 for charging during low periods and to provide additional power during high (peak) load periods, such as meal preparation/service times. In some embodiments, at least one ultra capacitor bank, a super capacitor bank, and/or an energy storage source may be used in place of or in conjunction with the battery pack 40 or other energy source. The battery pack 40 or other energy source may be part of the fuel cell system 10 or may be located in a separate location.

The power management system 30 may be configured to provide power to the galley 12, at least one additional monument, such as a lavatory, other monument, and/or any other electrical consumer, and may be configured to function at the different operating voltages of the applicable systems. In certain embodiments, an inverter may be included with the power management system 30 to provide alternating current ("AC") power to those applicable gains 32 or other equipment that require AC power.

Figure 6:
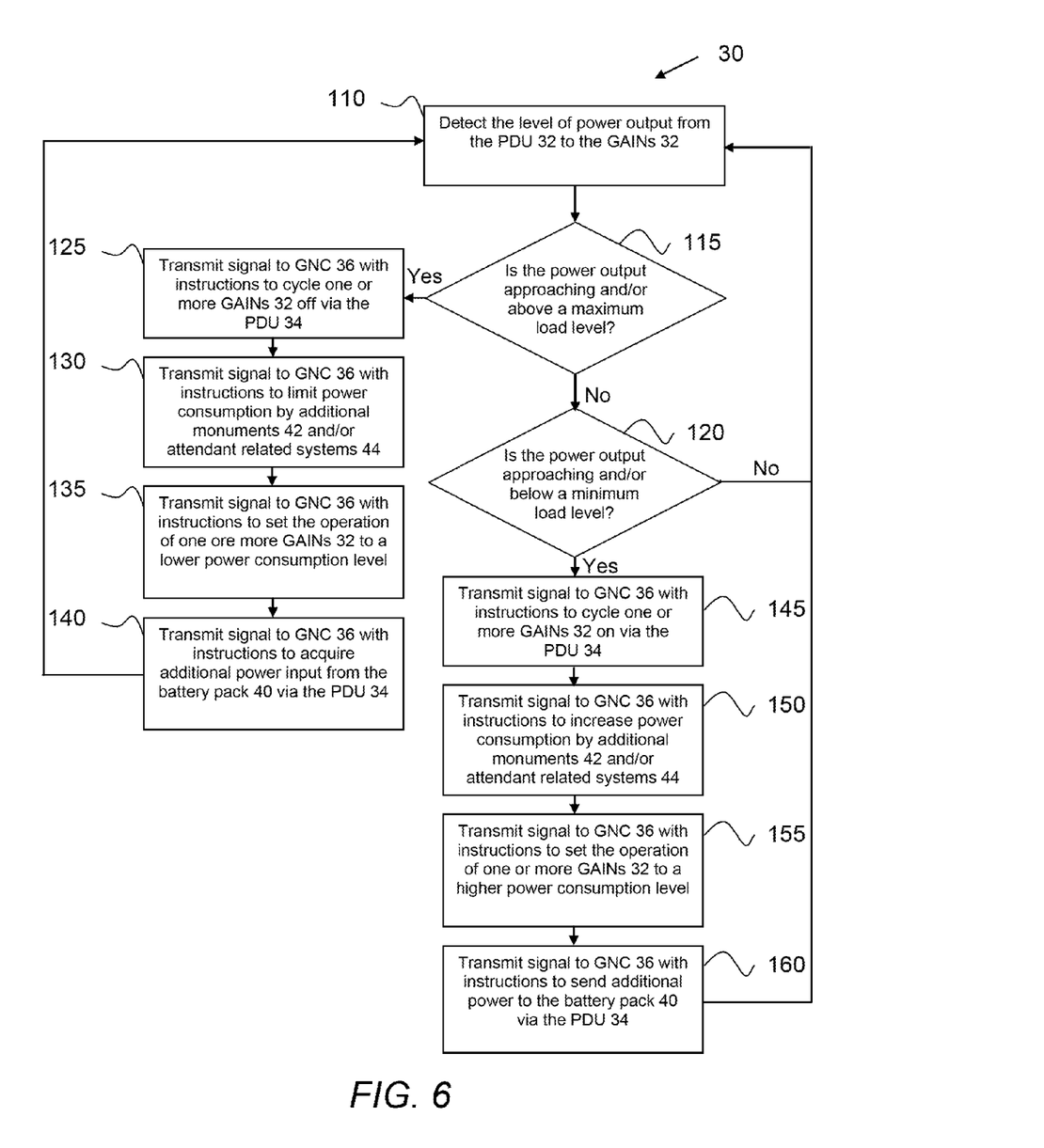
FIG. 6 is a simplified flow diagram illustrating a control method for a fuel cell system, according to certain embodiments of the present invention.

According to these embodiments, the operation of the power management system 30 is illustrated in a simplified flow diagram shown in FIG. 6.

The power management system 30 may include processing logic that may comprise hardware (circuitry, dedicated logic, etc.), software (such as is run on a general purpose computing system or a dedicated machine), firmware (embedded software), or any combination thereof.

At step 110, the control panel 38 detects the level of power output from the PDU 34 to the GAINs 32.

If, at step 115, the control panel 38 determines that the power output is approaching and/or exceeds a maximum load level programmed into the control panel 38, the control panel 38 may instruct the GNC 36 to perform one or more of steps 125-140, depending on the quantity of the power output and the operations in the galley 12, as well as the additional monuments 42 and/or attendant related systems 44. At step 125, the control panel 38 may instruct the GNC 36 to cycle individual GAINs 32 off via the PDU 34. At step 130, the control panel 38 may instruct the GNC 36 to limit the power consumption by additional monuments 42 and/or attendant related systems 44. At step 135, the control panel 38 may instruct the GNC 36 to set the operation of individual GAINs 32 to a lower power consumption level, such as not initiating an oven heating schedule, not heating water, etc. At step 140, the control panel 38 may instruct the GNC 36 to acquire additional power from the battery pack 40 via the PDU 34.

If, at step 115, the control panel 38 does not determine that the power output is approaching and/or above a maximum load level programmed into the control panel 38, then the control panel 38 proceeds to step 120. If, at step 120, the control panel 38 determines that the power output is approaching and/or is below a minimum load level programmed into the control panel 38, the control panel 38 may instruct the GNC 36 to perform one or more of steps 145-160, depending on the quantity of the power output and the operations in the galley 12, as well as the additional monuments 42 and/or attendant related systems 44. At step 145, the control panel 38 may instruct the GNC 36 to cycle individual GAINs 32 on via the PDU 34. At step 150, the control panel 38 may instruct the GNC 36 to increase the power consumption by additional monuments 42 and/or attendant related systems 44. At step 155, the control panel 38 may instruct the GNC 36 to set the operation of certain GAINs 32 to a higher power consumption level, such as initiating an oven heating schedule, heating water, etc. At step 160, the control panel 38 may instruct the PDU 34 (via the GNC 36) to send additional power from the fuel cell system 10 to the battery pack 40.

One of ordinary skill in the relevant are will understand that the particular response by the control panel 38 (to increase or decrease the amount of power consumed via various commands) will be dependent upon the particular activities within the galley 12, as well as the logic programmed into the control panel 38 regarding prioritizing power consumption and efficiency.

The control panel 38 repeats steps 110-160 as frequently as needed to maximize the efficient use of the power output from the fuel cell system 10.

Figure 7:
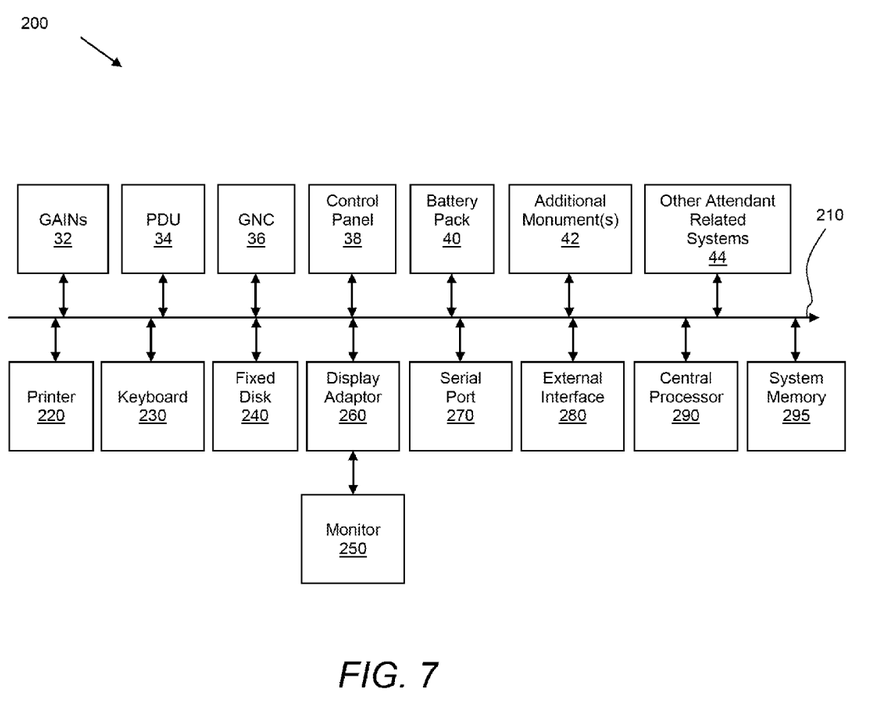
FIG. 7 is a diagram of a computer system apparatus for the power management system of FIG. 5.

FIG. 7 is a diagram of a computer apparatus 200, according to certain exemplary embodiments. The various participants and elements in the previously described system diagrams (e.g., the power management system 30 in FIG. 5) may use any suitable number of subsystems in the computer apparatus 200 to facilitate the functions described herein. Examples of such subsystems or components are shown in FIG. 5. The subsystems or components shown in FIG. 5 may be interconnected via the system bus 210 or other suitable connection. In addition to the subsystems described above, additional subsystems such as a printer 220, keyboard 230, fixed disk 240 (or other memory comprising computer-readable media), monitor 250, which is coupled to a display adaptor 260, and others are shown. Peripherals and input/output (I/O) devices (not shown), which couple to the control panel 38, can be connected to the system 100 by any number of means known in the art, such as a serial port 270. For example, the serial port 270 or an external interface 280 may be used to connect the control system 100 to a wide area network such as the Internet, a mouse input device, or a scanner. The interconnection via the system bus 210 allows a central processor 290 to communicate with each subsystem and to control the execution of instructions from a system memory 295 or the fixed disk 240, as well as the exchange of information between subsystems. The system memory 295 and/or the fixed disk 240 may embody a computer-readable medium.

The software components or functions described in this application may be implemented via programming logic controllers ("PLCs"), which may use any suitable PLC programming language. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, an optical medium such as a CD-ROM, or a DNA medium. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

In some embodiments, water from the fuel cell system 10 is directed into a tank for storage, wherein the stored water from the storage tank may then be directed to the appropriate area of the galley 12. In other embodiments, a tank is not used and water is directed from the fuel cell system 10 to the galley 12 directly. Water may be directed to the faucet of the sink for hand or other washing, beverage maker, water heater, or may be directed for other purposes. Depending on the location of the fuel cell system 10, a pump or other suitable mechanism may be used to distribute the water to the appropriate area of the galley 12. If the fuel cell system 10 is positioned above the appropriate area, the water may be permitted to flow by gravity to the appropriate area.

In embodiments where one or more separate fuel cell systems 10 are used to power the galley 12, the water storage tank optionally may be in communication with the aircraft's main potable water tank. In this way, if the water generated from the fuel cell system 10 is not sufficient to meet water needs in the galley 12, water from the aircraft's main water tank can be utilized as well. Also, surplus water generated from the fuel cell system 10 may be directed into the aircraft's main potable water tank. Hot water from the fuel cell system 10 may also be introduced into the main potable water tank to dilute (cool) the fuel cell system hot water to a suitable temperature and/or to heat the water already stored in the main potable water, depending on the volume involved.

In certain embodiments, the fuel cell system 10 produces moisture as a by-product. A heat exchanger may be used to condense the moisture and recover water from it. The heat exchanger may also be used to cool the water so it is suitable for use for hand washing, and the like. Since the water recovered from the fuel cell system 10 is between approximately 65 degrees Celsius and approximately 80 degrees Celsius, using water from the fuel cell system 10 in the galley sinks eliminates the need for water heaters that are typically used to heat water supplied to the sinks, which reduces costs and storage space requirements and conserves energy. If used, the heat exchanger may include controls so that the hot water recovered from the fuel cell system 10 may be cooled to the appropriate and/or desired temperature.

Once the water has been recovered from the moisture, it optionally may be directed into a storage tank as discussed above and/or may be further treated. For example, the water may be subjected to ultraviolet light to destroy any pathogens in the water. Alternatively or additionally, the water may be treated with chlorine, filtered, or otherwise processed to remove bacteria, other pathogens, and/or any material particles (such as metal, silicium, etc.). If necessary, the water may be treated to be potable for human use and/or consumption.

Another by-product of the fuel cell system 10 is hot oxygen-depleted air. The hot ODA is produced at a temperature sufficient to dry and/or sanitize and/or heat surfaces 28 of the galley 12, such as the floor 26, the sink, any handles, the trash bin, and any other desired surface.

In some cases, the ODA as produced by the fuel cell system 10 contains moisture, and a condenser or other suitable mechanism may be used to remove the moisture or otherwise dry the ODA before use. The hot ODA (and/or heat) from the fuel cell system 10 may be directed through air ducts in the ceiling or other suitable location into the galley 12. The hot ODA and/or heat may be used to heat the galley 12 and/or its surfaces 28, to dry any wet surfaces, and/or kill any pathogens in the air or on any surfaces. In some embodiments, the hot ODA and/or heat is directed through the ducts and into the galley 12 periodically, such as in regular or irregular bursts. In some embodiments, the crew controls the introduction of the ODA into the galley 12 so as to avoid introduction of the ODA and/or heat during preparation time in the galley 12.

Each of the fuel cell system by-products described above may be used alone or in combination with other by-products or other power sources to meet various needs of the lavatory unit. As one of many examples, the water and/or ODA and/or heat by-products may be used for surface cleaning. One or both of the power and water generated may be used as a grey water interface valve and for water line heating. Moreover, the galley trash compactor described above may use both heat and electrical energy generated from the fuel cell system 10.

Using a fuel cell system 10 to power a galley 12 as described above may reduce the use of fossil fuels and also reduce noise and $CO_2$ emissions. In some embodiments, some or all of the by-products of the fuel cell system 10 are utilized to power a galley 12, thus increasing the efficiency of the fuel cell system 10. In addition, using water recovered from the fuel cell system 10 in the galley 12 and otherwise can reduce the amount of water that needs to be brought onto the aircraft and stored in potable water tanks, which in turn can reduce the weight of the aircraft and lead to cost savings during takeoff and during flight. Moreover, reducing the amount of water required to be stored the potable water tanks means a smaller water tank may be used, which results in both a lighter water tank and less space being allocated to house the water tank.

The foregoing is provided for purposes of illustrating, explaining, and describing embodiments of the invention. Further modifications and adaptations to these embodiments will be apparent to those skilled in the art and may be made without departing from the scope or spirit of the invention. As one example, instead of a fuel cell system, another suitable power source that is independent from the aircraft's main power system may be used.

That which is claimed is:

1. A power management system comprising:
   (a) at least one fuel cell system;
   (b) a power distribution unit electrically connected to the at least one fuel cell system so as to receive a power output from the at least one fuel cell system;
   (c) at least one galley insert electrically connected to the power distribution unit so as to receive a power output from the power distribution unit;
   (d) a galley network controller;
   (e) an energy source and/or an energy storage source electrically connected to the at least one fuel cell system and the power distribution unit;
   (f) one or more processors in communication with the galley network controller, the power distribution unit, and the at least one galley insert; and
   (g) memory including instructions that, when executed by the one or more processors, cause the one or more processors to:
   compare a power output from the power distribution unit to a maximum load level; and
   transmit a signal to the galley network controller instructing the galley network controller to acquire a power output from the energy source and/or the energy storage source via the power distribution unit and to cycle the at least one galley insert off via the power distribution unit and/or set an operation of the at least one galley insert to a lower power consumption level when the power output is equal to or above the maximum load level, wherein the instructions,
   when executed by the one or more processors, cause the one or more processors to: compare the power output from the power distribution unit to a minimum load level; and
   transmit a signal to the galley network controller instructing the galley network controller to send at least a portion of the power output from the at least one fuel cell system to the energy source and/or the energy storage source via the power distribution unit when the power output is equal to or below the minimum load level.

2. The power management system of claim 1, further comprising at least one of an ultra capacitor bank, super capacitor bank, and an energy storage source.

3. The power management system of claim 1, further comprising at least one of an additional monument and an attendant related system in communication with the galley network controller.

4. The power management system of claim 3, wherein the instructions, when executed by the one or more processors, cause the one or more processors to:
   compare the power output from the power distribution unit to a minimum load level;
   transmit a signal to the galley network controller instructing the galley network controller to limit power consumption by the at least one additional monument and attendant related system when the power output is equal to or above the maximum load level; and transmit a signal to the galley network controller instructing the galley network controller to increase power consumption by the at least one additional monument and attendant related system when the power output is equal to or below the minimum load level.

5. The power management system of claim 1, wherein the at least one fuel cell system further comprises at least one other output of thermal energy, water, or oxygen-depleted air.

6. The power management system of claim 5, wherein a galley is powered by the power output from the at least one fuel cell system and the at least one other output of the at least one fuel cell system.

7. A method of operating a power management system comprising at least one galley insert powered by at least one fuel cell system, the power management system comprising a power distribution unit, an energy source and/or an energy storage source electrically connected to the at least one fuel cell system and the power distribution unit, a galley network controller, and a control panel, the method comprising:
comparing a power output from the power distribution unit to a maximum load level or comparing the power output from the power distribution unit to a minimum load level;
and transmitting a signal to the galley network controller instructing the galley network controller to acquire a power output from the energy source and/or the energy storage source via the power distribution unit and to cycle the at least one galley insert on or off via the power distribution unit and/or set an operation of the at least one galley insert to a lower power consumption level when the power output is equal to or above the maximum load level or to a higher power consumption level when the power output is equal to or below the minimum load level, and
transmitting a signal to the galley network controller instructing the galley network controller to send at least a portion of the power output from the at least one fuel cell system to the energy source and/or the energy storage source via the power distribution unit when the power output is equal to or below the minimum load level.

8. The method of claim 7, further comprising at least one of an ultra capacitor bank, a super capacitor bank, and an energy storage source.

9. The method of claim 7, further comprising at least one of an additional monument and an attendant related system, wherein the method further comprises:
transmitting a signal to the galley network controller instructing the galley network controller to limit power consumption by the at least one additional monument and attendant related system when the power output is equal to or above the maximum load level; and
transmitting a signal to the galley network controller instructing the galley network controller to increase power consumption by the at least one additional monument and attendant related system when the power output is equal to or below the minimum load level.

10. The method of claim 7, wherein the at least one fuel cell system further comprises at least one other output of thermal energy, water, or oxygen-depleted air.

11. The method of claim 10, wherein a galley is powered by the power output from the at least one fuel cell system and the at least one other output of the at least one fuel cell system.

12. The method of claim 7, wherein the at least one galley insert comprises a bun warmer, a convection oven, a water heater, a beverage maker, a bar cart, or an area light.

13. The power management system of claim 1, wherein the instructions, when executed by the one or more processors, cause the one or more processors to:
compare the power output from the power distribution unit to a minimum load level; and
transmit a signal to the galley network controller instructing the galley network controller to cycle the at least one galley insert on via the power distribution unit and/or set the operation of the at least one galley insert to a higher power consumption level when the power output is equal to or below the minimum load level.

14. The power management system of claim 1, wherein the at least one galley insert comprises a bun warmer, a convection oven, a water heater, a beverage maker, a bar cart, or an area light.

15. The power management system of claim 1, further comprising a control panel in communication with the one or more processors, the galley network controller, the power distribution unit, and the at least one galley insert.

16. The power management system of claim 1, wherein the energy source and/or the energy storage source comprises at least one battery pack electrically connected to the at least one fuel cell system and the power distribution unit so as to send a power output to the power distribution unit and to receive at least a portion of the power output from the at least one fuel cell system.

* * * * *